Figure 1:
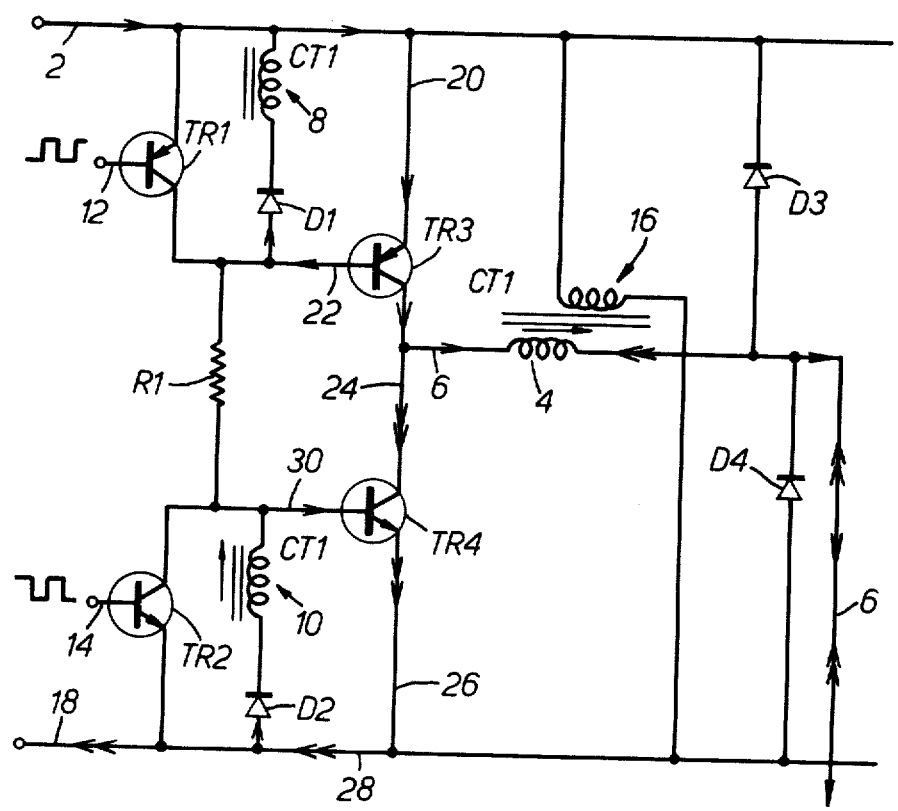

United States Patent [19]
Melling

[11] 4,298,925
[45] Nov. 3, 1981

[54] TRANSISTORIZED INVERTOR

[75] Inventor: John R. Melling, Gosport, England

[73] Assignee: Plessey Handel und Investments AG, Zug, Switzerland

[21] Appl. No.: 56,261

[22] Filed: Jul. 10, 1979

[51] Int. Cl.³ .......................................... H02M 7/537
[52] U.S. Cl. ................................................... 363/131
[58] Field of Search ............................... 363/131–133, 363/97, 98

[56] References Cited

U.S. PATENT DOCUMENTS

| | | |
|---|---|---|
| 3,265,953 | 8/1966 | Wellford ............................. 363/131 |
| 3,588,669 | 6/1971 | Wellford et al. ..................... 363/132 |
| 3,879,650 | 4/1975 | Lachocki ............................. 363/131 |

FOREIGN PATENT DOCUMENTS

| | | |
|---|---|---|
| 1045369 | 10/1966 | United Kingdom . |
| 1503378 | 3/1978 | United Kingdom . |
| 1556230 | 11/1979 | United Kingdom . |

*Primary Examiner*—William M. Shoop
*Attorney, Agent, or Firm*—Fleit & Jacobson

[57] ABSTRACT

A transistorized invertor which is for inverting d.c. to one or more phases of a.c. and in which for the or each phase to be produced there is provided a current transformer primary in an output line of the invertor with the secondary of the current transformer in a base drive circuit for the invertor, the current transformer being effective to feed a proportion of the output current of the invertor back to the base drive circuit in order to provide base drive current for the base drive circuit.

4 Claims, 2 Drawing Figures

TRANSISTORIZED INVERTOR

This invention relates to a transistorised invertor.

With low voltage supply-fed transistorised invertors, base drive losses are a significant factor in the efficiency of the invertor. This situation is made worse by large variations in d.c. supply rail voltage, such variations occuring for example in aerospace applications.

It is an aim of the present invention to provide a transistorised invertor in which the above-mentioned disadvantages are obviated or reduced.

Accordingly, this invention provides a transistorised invertor which is for inverting d.c. to one or more phases of a.c. and in which for the or each phase to be produced there is provided a current transformer primary in an output line of the invertor with the secondary of the current transformer in a base drive circuit for the invertor, the current transformer being effective to feed a proportion of the output current of the invertor back to the base drive circuit in order to provide base drive current for the base drive circuit.

Preferably, for the or each phase to be inverted, the invertor has first and second main transistors, and the current transformer then has a primary winding connected in the output line and a secondary winding for each of the first and second main transistors, each secondary winding providing base drive current for the base of its associated first or second main transistor.

The transistorised invertor may include a diode associated with each secondary winding for preventing reverse current passing through its secondary winding. Devices other than diodes may be employed if desired.

The transistorised invertor preferably includes a bias winding which is wound on the core of the current transformer and is connected across a d.c. rail supplying a d.c. input to the invertor.

The transistorised invertor may include a resistance for causing an initial current to be applied alternately to the base of the first and second transistors when the invertor commences operation. This resistance, or other equivalent arrangement, ensures that the invertor commences operation since otherwise difficulty can be encountered in getting initial current generated in the primary winding.

Figure 2:
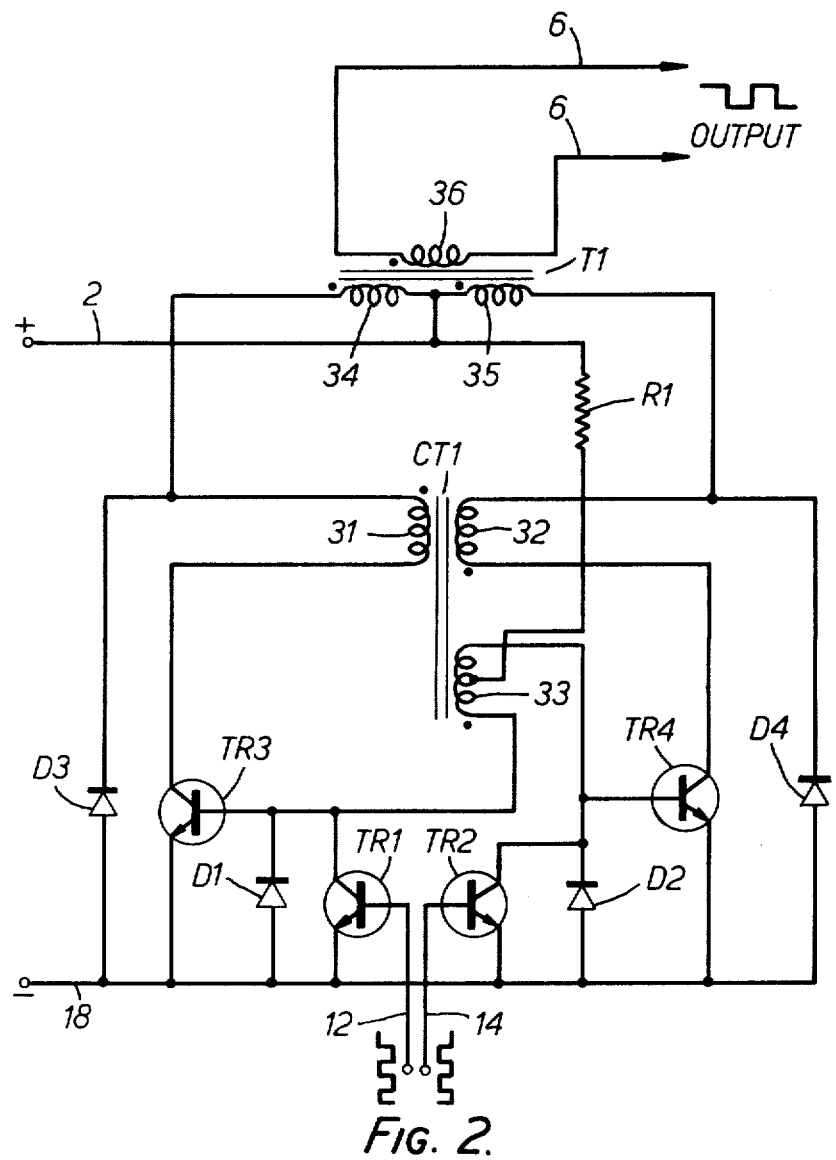

An embodiment of the invention will now be described solely by way of example and with reference to the accompanying drawings in which:

FIG. 1 shows the circuit required in a transistorised invertor of the invention for each phase of inverted a.c. current requiring to be produced; and FIG. 2 shows the circuit required in a transistorised invertor of the invention used in a push/pull mode.

Referring to FIG. 1, there is shown a circuit for a transistorised invertor comprising a first main transistor TR3 and a second main transistor TR4. Direct current requiring to be inverted passes to the transistors TR3, TR4 from a d.c. rail 2. This direct current can vary in voltage and it may be, for example, of from 16 to 32 volts. The transistors TR3, TR4 alternately feed current through a primary winding 4 of a current transformer CT1 to or from the load. The transformer CT1 is provided in an output line 6 for the invertor.

The base of the transistor TR3 is provided with base drive current from a base drive circuit comprising a secondary winding 8 for the current transformer CT1 and a diode D1. Similarly, the base drive current for the base of the transistor TR4 is provided by a base drive circuit comprising a secondary winding 10 for the current transformer CT1 and a diode D2. A transistor TR1 is associated with the base drive circuit for the transistor TR3 and a transistor TR2 is associated with the base drive circuit for the transistor TR4. These transistors TR1, TR2 are employed to appropriately short-out the windings 8, 10 alternately so that the two base drive circuits alternate whereby current is alternately supplied to the transistors TR3, TR4. The transistors TR1, TR2 are fed with current which is in anti-phase and which is fed to the transistors TR1, TR2 along leads 12, 14 respectively.

A resistance R1 is connected as shown between the base drive circuits for the transistors TR3, TR4. This resistance R1 has a large resistance value and it initiates conduction in the transistors TR3, TR4 and thus enables the invertor to commence operation.

A bias winding 16 is connected between the rail 2 and an input rail 18. The bias winding 16 is wound on the core of the current transformer CT1.

The diode D3 is connected between the output line 6 and the rail 2 and a diode D4 is connected between the output line 6 and the rail 18.

In operation of the circuit, with the transistors TR2, TR3 on and the transistors TR1, TR4 off, current flow will be along the rail 2, along lead 20 to the transistor TR3. The majority of the current will then pass through the transistor TR3 to the output line 6 via the primary winding 4 of the current transformer CT1. This current in the primary winding 4 will induce a current in the secondary winding 8 so that current will also flow in the direction of leads 20, 22, the diode D1, the secondary winding 8 and the rail 2. The current in this base drive circuit provides a base drive current for the base of the transistor TR3. The amount of current provided for the base of the transistor TR3 is a function of the collector current and the turns ratio in the current transformer. As the collector current increases, the base current increases proportionally. Therefore, if the turns ratio is chosen to be same as the minimum gain of the transistor TR3, the transistor TR3 will always be provided with the correct base current to just keep it in saturation.

Transistors TR1 and TR2 are switched alternately by means of appropriate current passing along the leads 12, 14. The transistors TR1, TR2 are switched alternately at the required output frequency to short the windings 8, 10 as desired and in turn. This causes the main transistors TR3, TR4 to also switch at the required frequency.

When the transistors TR1, TR4 are on, current will pass from the load along leads 6 and 24 to the transistor TR4, via the primary winding 4, through the transistor TR4 to the lead 26, along lead 28 to the supply. The current in the primary winding 4 will induce a current in the secondary winding 10 so that current will flow in the base circuit, winding 10, lead 30, transistor TR4, leads 26 and 28 and diode D2. This provides the base of transistor TR4 with the appropriate value of base current.

As indicated above, the resistor R1 has a large resistance value and it initiates conduction in the transistors TR3, TR4 at the start of each half cycle.

The diodes D1, D2 prevent reverse voltages on the collector-to-emitter of the transistors TR2/TR1 and base-to-emitter on the transistors TR3/TR4. The bias winding 16 balances out any out-of-balance between the bases of the transitors TR3 and TR4.

The diodes D3 and D4 provide a current path for inductive loads. More specifically, when the transistor TR3 is switched out, the current in the output line 6 continues flowing and this causes a voltage to build up which would destroy the transistor TR4. The diode D3 provides an easy path for this inductive current and prevents damage to the transistor TR4. When the transistor TR4 is switched out, the diode D4 provides a current path for the inductive current and protects transistor TR3.

Referring now to FIG. 2, similar circuit parts as in FIG. 1 have been given the same reference numeral. The circuit of FIG. 2 shows the invention used in a push/pull mode.

In FIG. 2 and for the purpose of understanding, consider transistors TR4 and TR1 as turned on and transistors TR3 and TR2 as turned off. The leads 12 and 14 are the drive inputs for the transistors. The leads 12, 14 switch alternately as the waveform shows at the desired output frequency. Current flows from the positive lead 2 via the right hand half of the transformer T1, a winding 35, CT1 winding 32, the transistor TR4, and the negative lead 18. By the action of current flowing in the winding 32, a current is induced into winding 33. This current flows via the winding 33, the base of the transistor TR4 to the emitter of the transistor TR4, along the lead 18, through the diode D1 and back to the winding 33.

The control circuit causes the lead 12 to fall to zero and the lead 14 to go positive. This turns the transistor TR1 off and the transistor TR2 on. Turning the transistor TR2 on shorts the base of the transistor TR4 to its emitter and diverts the current flowing from base to emitter in the transistor TR4 and causes it to flow from the collector to the emitter of the transistor TR2. Consequently the transistor TR4 turns off. Current now starts to flow from the positive lead 2 via the resistor R1, the lower half of the winding 33, and the base to emitter of the transistor TR3. This turns the transistor TR3 on, causing a current to flow from the lead 2 via winding 34, winding 31, the collector to emitter of the transistor TR3 and back via lead 18. By the action of current flowing in the winding 31, a current is induced in the winding 33. This current flows from the winding 33 via the base to emitter of the transistor TR3, along the lead 18, up through diode D2 and back to the winding 33.

The current continues to run until the leads 12 and 14 reverse again, turning the transistor TR2 off. Turning on the transistor TR1 shorts the base to emitter of the transistor TR3, hence turning it off. Current flows from the lead 2 via the resistor R1, the top half of the winding 33, the base to emitter of the transistor TR4 and back via the lead 18. Hence the transistor TR4 turns on, which completes the cycle of events.

The flow of current in the windings 34 and 35 alternates the flux in the transformer core of the transformer T1 and induces a current in the winding 36. This gives an alternating output on the leads 6.

It is to be appreciated that the embodiments of the invention described above have been given by way of example only and that modifications may be effected. Thus, for example, in FIG. 1, the bias winding 16 could be dispensed with if a larger current transformer CT1 is employed so that the current transformer does not saturate so easily. It is also to be appreciated that the circuit arrangements shown in the drawings are for inverting to one phase. The circuit arrangements shown in the drawings are repeated for each phase of a.c. current to be produced.

We claim:

1. A transistorised invertor for inverting direct current to at least one phase of alternating current so as to provide an output current of said invertor, said invertor having an input line and an output line, comprising:
   a current transformer having a primary in said output line of the invertor, and having at least one pair of secondaries, one pair of secondaries for each said at least one phase, said at least one pair of secondaries including first and second secondaries;
   at least one pair of base drive circuits, one pair of base drive circuits for each said at least one phase, said at least one pair of base drive circuits including first and second base drive circuits which respectively include said first and second secondaries of the current transformer; and
   at least one pair of transistors, one pair of transistors for each of said at least one phase, each pair of transistors including first and second main transistors, each said first and second main transistors having a base;
   said first and second secondaries being connected to the base of said first and second main transistors, respectively, said current transformer feeding a proportion of the output current of the invertor, via said first and second secondaries, to the base of said first and second main transistors, respectively, in order to provide base drive current thereto, said invertor including a respective diode associated with each secondary and connected thereto for preventing reverse current from passing through said each secondary.

2. A transistorised invertor for inverting direct current to at least one phase of alternating current so as to provide an output current of said invertor, said invertor having an input line and an output line, comprising:
   a current transformer having a primary in said output line of the invertor, and having at least one pair of secondaries, one pair of secondaries for each said at least one phase, said at least one pair of secondaries including first and second secondaries;
   at least one pair of base drive circuits, one pair of base drive circuits for each said at least one phase, said at least one pair of base drive circuits including first and second base drive circuits which respectively include said first and second secondaries of the current transformer; and
   at least one pair of transistors, one pair of transistors for each of said at least one phase, each pair of transistors including first and second main transistors, each said first and second main transistors having a base;
   said first and second secondaries being connected to the base of said first and second main transistors, respectively, said current transformer feeding a proportion of the output current of the invertor, via said first and second secondaries, to the base of said first and second main transistors, respectively, in order to provide base drive current thereto, said invertor including a bias winding which is wound on the current transformer and which is connected across a direct current rail for supplying said direct current to the invertor.

3. A transistorised invertor according to claim 2, including resistance means connected to said pair of transistors for causing an initial current to be applied alternately to the bases of the first and second main transistors when the invertor commences operation.

4. A transistorised invertor for inverting direct current to at least one phase of alternating current so as to provide an output current of said invertor, said invertor having an input line and an output line, comprising:
- a current transformer having a primary in said output line of the invertor, and having at least one pair of secondaries, one pair of secondaries for each said at least one phase, said at least one pair of secondaries including first and second secondaries;
- at least one pair of base drive circuits, one pair of base drive circuits for each said at least one phase, said at least one pair of base drive circuits including first and second base drive circuits which respectively include said first and second secondaries of the current transformer; and
- at least one pair of transistors, one pair of transistors for each of said at least one phase, each pair of transistors including first and second main transistors, each said first and second main transistors having a base;
- said first and second secondaries being connected to the base of said first and second main transistors, respectively, said current transformer feeding a proportion of the output current of the invertor, via said first and second secondaries, to the base of said first and second main transistors, respectively, in order to provide base drive current thereto, said invertor further comprising an additional pair of transistors for each said at least one phase, said additional pair of transistors including first and second additional transistors, each said first and second additional transistors having a base and having an output connected to the base of a corresponding one of said first and second main transistors, said invertor further comprising means connected to the base of each said first and second additional transistors for providing anti-phase base driving current thereto.

* * * * *